D. BASCH.
PROTECTIVE DEVICE.
APPLICATION FILED OCT. 13, 1917.
1,315,809.
Patented Sept. 9, 1919.
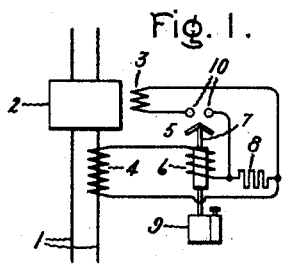
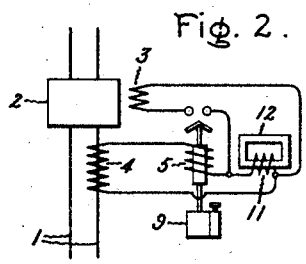
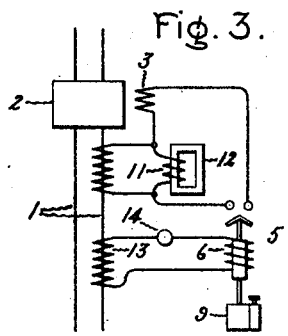
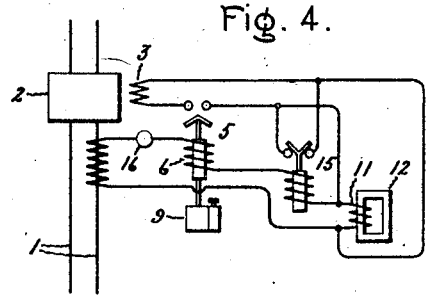
Inventor:
David Basch,
by
His Attorney

UNITED STATES PATENT OFFICE.

DAVID BASCH, OF SCHENECTADY, NEW YORK, ASSIGNOR TO GENERAL ELECTRIC COMPANY, A CORPORATION OF NEW YORK.

PROTECTIVE DEVICE.

1,315,809.   Specification of Letters Patent.   Patented Sept. 9, 1919.

Application filed October 13, 1917. Serial No. 196,544.

*To all whom it may concern:*

Be it known that I, DAVID BASCH, a citizen of the United States, residing at Schenectady, county of Schenectady, in the State of New York, have invented certain new and useful Improvements in Protective Devices, of which the following is a specification.

My invention relates to protective devices and especially to protective relays, and has for its object to provide a relay scheme for controlling auxiliary apparatus on alternating current systems of distribution and more particularly for controlling the operation of trip coils for automatic switches or circuit breakers from the source of alternating current.

On alternating current systems of distribution it is customary to control the trip coils of automatic circuit breakers, as well as other control coils, from an auxiliary source of direct current, rather than from the source of alternating current, but in many alternating current stations, no source of direct current is available. In such instances, it has been the practice to energize the trip coils from transformers, providing a circuit opening relay in the transformer circuit which normally closes a shunt circuit around the trip coil and is operative to open the shunt circuit in response to abnormal conditions, to permit the energization of the trip coil. The use of circuit closing relays have been limited by the fact that the secondary of the transformer for energizing the trip coils can not be operated open circuited. The schemes using circuit opening relays have, however, been the subject of difficulties, due to the poor contact made by the relay, causing leakage to occur through the trip coil, which in turn causes excessive heating of the coil and fluctuation of its plunger. Furthermore, instruments are often connected in the same transformer circuit and such leakages cause them to give erroneous readings. Again, upon the systems where the short circuit current is more than ten times the normal rating of the current transformers, the use of circuit opening relays should be avoided, because the current would be too great for the contacts of the relay to open repeatedly.

By the novel scheme of my invention, I overcome all the difficulties which occur with schemes using circuit opening relays by providing a control scheme in which the secondary of a current transformer is closed through a circuit closing relay and a current limiting means and the trip coil connected in a normally open circuit in shunt to the current limiting means which circuit is controlled by the circuit closing relay and energized from the voltage drop across the current limiting means.

The novel features which I believe to be characteristic of my invention will be indicated in the claims appended hereto, while the features of construction and mode of operation will be understood from the following description taken in connection with the accompanying drawings, in which:

Figure 1 shows diagrammatically a relay tripping scheme embodying the features of my invention, and Figs. 2, 3 and 4 are diagrammatical illustrations of schemes embodying modified forms of my invention.

In Fig. 1 my invention is shown, by way of illustration, as embodied in a single phase system of distribution comprising conductors 1, the circuit of which is controlled by an automatic circuit breaker 2, having a trip coil 3. Connected to one of the conductors 1 is a current transformer 4, the secondary circuit of which is normally closed through an electroresponsive device 5, comprising an actuating winding 6, and a movable armature 7. In the secondary circuit is also connected a current resisting or limiting means comprising a resistance element 8. The relay 5 may be of either the instantaneous or retarded type but is here shown as of the retarded circuit closing type in which the armature or contact controlling member 7 is movable to contact closing position, in response to the energization of the actuating winding 6, with a retarded or time delay action which, by way of illustration, is shown furnished by a dash-pot 9. The trip coil 3 is connected in a normally open circuit in shunt to the current limiting means or resistance element 8 and includes contacts 10 adapted to be closed in response to the actuation of relay 5.

Upon the occurrence of a current upon the system including conductor 1, in excess of a predetermined amount, the actuating winding 6 of relay 5 is sufficiently energized from the current traversing conductor 1 or transformer 4 to move its plunger into a position to bridge contacts 10, and complete the circuit including trip coil 3. This excess current traverses the resistance element 8 causing a drop in voltage across the resistance element 8 which is a function of the secondary current. The energy or current flowing in the circuit of relay 5 acts, by reason of the voltage drop across the element 8 to excite the trip coil in shunt thereto when the circuit of the trip coil is completed by relay 5 and the switch 2 is thereupon automatically opened.

In Fig. 2 I have shown a modified form of my invention in which the current limiting means comprises an inductance element 11 instead of the resistance element 8, and the drop in potential across the inductance or reactor is used to excite the trip coil. In this modification the reactor 11 is preferably provided with a laminated iron member 12 providing a magnetic circuit for the reactor which is so arranged that with a predetermined abnormal secondary current, the magnetic circuit becomes saturated. The function of the saturation effect is to limit the drop in voltage which can occur across the reactor on excessive currents, to a certain amount, that is the drop in voltage across the reactor 11 increases with the secondary current up to a current value which will cause magnetic saturation of the member 12 and upon current values above this predetermined amount, the drop in voltage across the reactor will be substantially constant, thus limiting the current which can be impressed upon the trip coil 3.

When the trip coil circuit is closed by its control relay 5, due to the high volt ampere load imposed by the current limiting means upon the tripping transformers, it is considered better practice not to connect meters or instruments to the circuit of the tripping transformer, but to use as best shown in Fig. 3, a separate instrument transformer 13 for exciting the relay in which circuit an instrument or meter 14 may be connected.

In order, however, to overcome the objection to the use of separate transformers for the trip coil and for instruments, the scheme shown in Fig. 4 may be used, which is another modification of my invention in which a single transformer is used for both instruments or meters and for tripping. In this modification, two relays are provided, the circuit closing retarded relay 5 controlling the circuit of the trip coil 3 which is energized from the drop in voltage across the reactor 11, while an instantaneous circuit opening relay 15 is connected in series, for normally closing a short circuit about the reactor 11, thus providing a means for normally eliminating the high volt ampere load effect imposed by the reactor. An instrument or meter, 16 may be, therefore, connected in the circuit of the transformer. Upon occurrence of abnormal conditions, the relay 15 operates instantaneously to open the short circuit about the reactor 11 to include the reactor in circuit, across which a voltage drop occurs, which is sufficient to energize the trip coil 3, the circuit of which is closed after a time interval by the relay 5.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. The combination with an electrical conductor, a relay operative in response to current in said conductor above a predetermined amount, a control coil, a current limiting means in the circuit of said relay, and a normally open circuit in shunt to said current limiting means including said control coil which circuit is closable in response to the actuation of said relay and energized from the current in said conductor by reason of the voltage drop across said current limiting means.

2. In an alternating current system of distribution, the combination with a current transformer, means in said transformer circuit across which a drop in voltage occurs, a trip coil in a normally open circuit in shunt to said means adapted to be energized from said transformer by reason of said voltage drop, and electroresponsive means for closing said trip coil circuit in response to predetermined abnormal conditions.

3. The combination with an electrical conductor, a circuit connected to said conductor, an overload relay in said circuit, a current limiting means in said circuit, a normally open circuit in shunt to said current limiting means adapted to be closed by the actuation of said relay, a trip coil in said normally open circuit energized by the current due to drop in potential across said current limiting means when said circuit is closed.

4. The combination with an automatic circuit breaker, a current transformer connected in the circuit of said breaker, a current resisting means in said transformer circuit across which a drop in voltage occurs, tripping means for said circuit breaker operative in response to the current due to the voltage drop across said current resisting means, and an electro-responsive device for holding said tripping means inoperative until the occurrence of predetermined abnormal conditions.

5. The combination with an electrical conductor, a transformer responsive to current in said conductor, a relay operative with a retarded action in response to current in said transformer circuit above a predetermined amount, current limiting means in said transformer circuit, a normally open circuit in shunt to said current limiting means adapted to be closed by the operation of said relay, a trip coil in said normally open circuit energized from said transformer by reason of the drop in voltage across said current limiting means, and means normally short circuiting said current limiting means and instantaneously operative to open said short circuit in response to currents above a predetermined amount.

6. The combination with an electrical conductor, a transformer responsive to current in said conductor, electroresponsive means in said transformer circuit operative upon currents above a predetermined amount, a current limiting means in said transformer circuit having a voltage drop which increases with the current up to a predetermined amount and then remains substantially constant, a normally open circuit in shunt to said current limiting means closable by the operation of said electroresponsive means, and a trip coil in said normally open circuit energized from said transformer by reason of the drop in voltage across said current limiting means.

In witness whereof, I have hereunto set my hand this 12th day of October, 1917.

DAVID BASCH.